Aug. 9, 1932. J. W. LAMBERT 1,870,739
LAWN BROOM
Filed Feb. 27, 1928
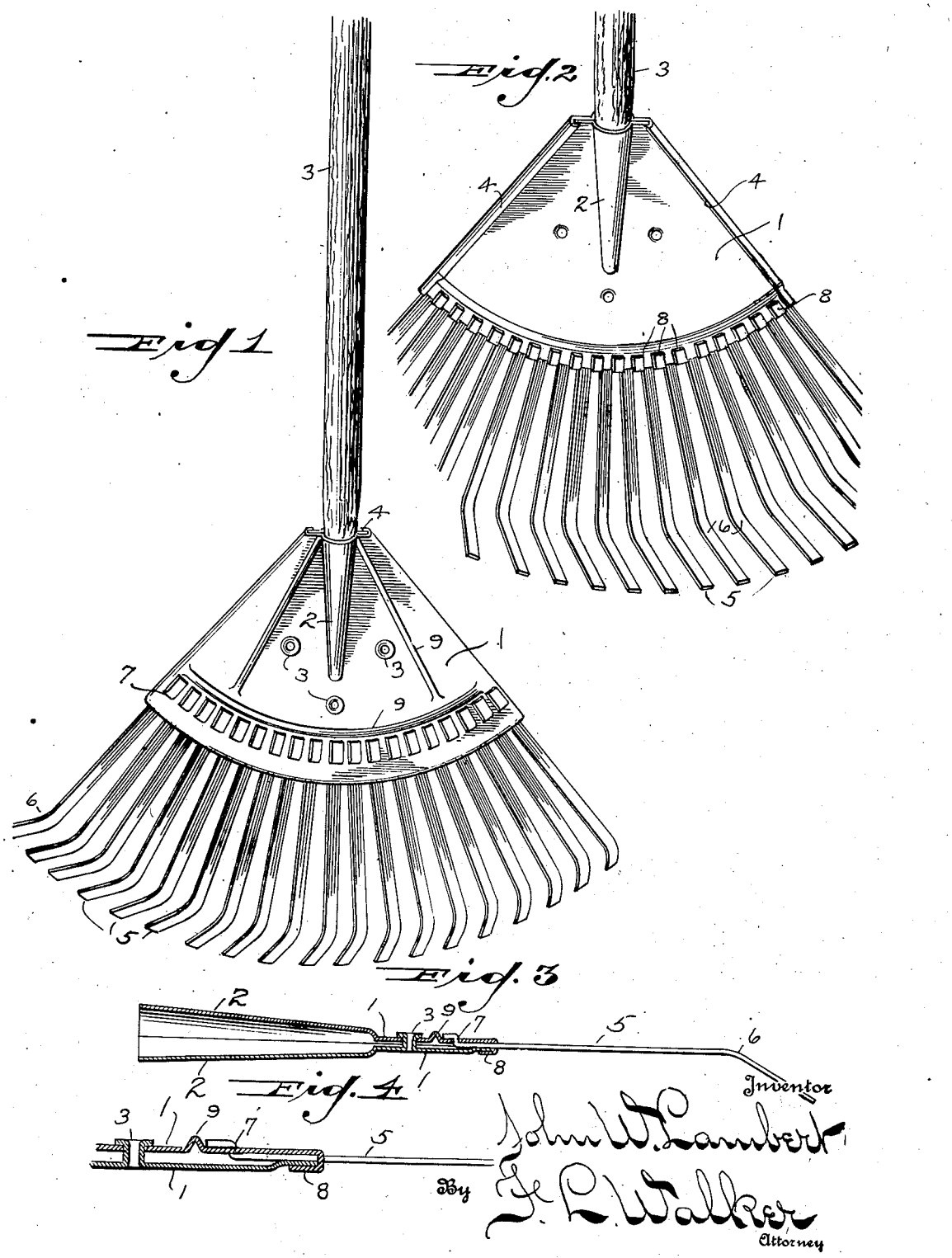

Patented Aug. 9, 1932

1,870,739

UNITED STATES PATENT OFFICE

JOHN W. LAMBERT, OF ANDERSON, INDIANA

LAWN BROOM

Application filed February 27, 1928. Serial No. 257,464.

My invention relates to rakes, and more particularly, to a lawn broom or rake for removing leaves and litter. The present invention embodies a lawn broom formed from two substantially sector shaped plates having at their apices registering tapered or semi-conical indentations forming a socket for a handle shaft. Interposed between the plates and projecting beyond their margins is a series of radially disposed spaced fingers, preferably formed from flat spring stock. The inner ends of these spaced fingers are clamped between the plates, one of which is provided with a series of holes through which the inner ends of the fingers are projected with their terminal portions lying exteriorly of such plate and in parallel relation thereto. This offset parallel disposition of the inner ends of the fingers affords a pair of oppositely disposed shoulders having thrust engagement within the holes of the plate to prevent longitudinal displacement of the fingers. One of the plates is provided with a series of integral marginal tongues which are bent reversely about the margin of the other plate intermediate the fingers to maintain their relative spacing. The plates are formed with lineally indented beads or ribs to stiffen and strengthen the supporting structure.

The object of the invention is to simplify the structure, as well as the mode of assembly of lawn brooms or rakes, and the like, whereby they will not only be cheapened in construction, but will be more efficient in use, securely assembled, durable, and unlikely to get out of repair.

A further object of the invention is to provide a lawn broom or rake which will be of light weight, and wherein the fingers or tines will be of spring material and comparatively broad to prevent tearing of the turf.

A further object of the invention is to provide improved means for interlocking the spaced fingers with the supporting plate.

With the above primary and other incidental objects in view, as will more fully appear in the specification, the invention consists of the features of construction, the parts and combinations thereof, and the mode of operation, or their equivalents, as hereinafter described and set forth in the claims.

Referring to the accompanying drawing, wherein is shown the preferred, but obviously not necessarily the only form of embodiment of the invention, Fig. 1 is a perspective view of the assembled lawn broom or rake forming the subject matter hereof. Fig. 2 is a similar view showing the reverse side of the implement. Fig. 3 is a longitudinal sectional view. Fig. 4 is an enlarged detail view.

Like parts are indicated by similar characters of reference throughout the several views.

Referring to the drawing, 1—1 are a pair of substantially sector shaped supporting plates having in their inner faces registering tapered or semi-conical indentations 2—2 which forms a socket for a handle shaft. The plates 1—1 are fixedly interconnected with each other in parallel relation by means of rivets, eyelets, or the like as shown at 3, and by reversely bending the margins of the plates 1 over the other as indicated at 4. Interposed between the plates 1—1 is a series of sweeping fingers 5. These fingers 5 are preferably formed from flexible flat spring stock and have their outer ends slightly curved as at 6. One of the plates 1 is provided with a series of spaced holes in which are interlocked the inner ends of the sweeping fingers 5. The inner ends of such fingers 5 are reversely bent as at 7 to form oppositely disposed thrust shoulders, beyond which the respective portions of the sweeping fingers extend in parallel offset relation. Such offset portions of the sweeping fingers 5 are thrust through the holes in the plate whereby the oppositely disposed shoulders formed by the portion 7 resist longitudinal displacement of the fingers relative to the plate. The fingers are disposed with their terminal portions projecting exteriorly of the plate and in parallel relation thereto, while the main portions of such fingers 5 are clamped intermediate the plates 1—1. One of these plates is formed with a series of integral marginal tongues 8 which are reversely bent intermediate the spaced sweeping fingers 5 and clenched over the margin of the other plate 1 to fixedly secure the plates together and to maintain the sweeping fingers in their properly spaced relation. In order to strengthen and stiffen the supporting plates, such plates are embossed or lineally indented to form outwardly projecting beads or ribs 9.

From the above description it will be apparent that there is thus provided a construction of the character described possessing the particular features of advantage before enumerated as desirable but which obviously is susceptible of modification in its form, proportions, and arrangement of parts, without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a hand implement of the character described, a pair of substantially sector shaped clamp plates, said plates having therein registering radially disposed indentations at their apices forming an integral socket for a handle shaft, a handle shaft engaged therein, a plurality of radially disposed spaced flexible fingers clamped between said plates and projecting from the arcuate margin of said sector shaped plates, a plurality of marginal tongues formed upon one of the plates and clamped about the margin of the other plate intermediate said spaced fingers, one of the plates having therein a series of spaced holes, the inner ends of the fingers being laterally offset, the offset portions thereof being projected through the holes to the plate with their terminal ends extending exteriorly thereof and in parallel relation thereto.

2. In a hand implement of the character described, a pair of substantially sector shaped plates, registering semi-conical indentations radially disposed at the apices of said plates forming a socket for a handle shaft, and a plurality of radially disposed spaced fingers engaged intermediate the plates and projecting from the arcuate margin thereof, a reinforcement rib formed on one of the plates in substantially parallel spaced relation with the margin thereof and divergent ribs formed on the plate in substantial radial relation with its sector shape.

3. In a hand implement of the character described, a pair of parallel plates connected one the other, a plurality of flat flexible fingers fixedly engaged between the plates and projecting beyond the margins thereof in spaced relation with each other, a transverse rib formed on one of the plates substantially coincident with the inner terminals of said fingers, and a handle shaft engageable with said plates.

4. In a hand implement of the character described, a pair of plates connected to each other in parallel relation, a plurality of fingers fixedly engaged between the plates and projecting beyond the margins thereof, a plurality of integral marginal tongues formed upon one of the plates, said tongues being reversely bent about the margin of the other plate intermediate the said fingers and maintaining said fingers in relatively spaced relation.

5. In a hand implement of the character described, a pair of plates interconnected in parallel relation, a series of fingers interposed between the plates and projecting beyond the margins thereof in relatively spaced relation, one of the plates having a series of holes therein, the inner ends of the fingers being bent to offset parallel relation with the main portions of the fingers, thereby affording oppositely disposed shoulders engageable in said openings with the extremities of the fingers extending parallel with the plate.

6. In an implement of the character described, a supporting plate, a plurality of spaced fingers carried thereby and extending beyond the margin of the plate, said plate having a series of holes therein, the inner ends of the fingers being bent to offset parallel relation and thrust through said openings with the main portion of each finger disposed on one side of the plate and in parallel relation therewith and the terminal portion of the finger disposed on the opposite side of the plate and also in parallel relation therewith and a clamping member overlying the plate overlapping portions of the fingers for maintaining the fingers in interlocked parallel relation with the plate.

7. In an implement of the character described, a pair of parallel plates, a handle shaft secured thereto, a plurality of spaced fingers clamped between the plates, and a plurality of integral tongues on one plate extending into overlapping clenched engagement with the opposite plate and intermediate the fingers to maintain them in their relatively spaced relation.

8. In an implement of the character described, a plate having therein a series of elongated holes, a handle shaft engaged therewith, a plurality of separate flat spring fingers engageable with the plate, angular spaced bends adjacent the inner ends of said fingers, such bent portions being thrust through the holes with the portions of the fingers at opposite sides of the bends lying on opposite sides of the plate, and in substantially parallel relation therewith and a retaining member disposed transversely of the plurality of fingers intermediate the holes in the plate and the margin thereof beyond which the fingers extend for maintaining the fingers in parallel interlocked relation with the plate.

9. In an implement of the character described, a substantially sector shaped supporting member, a handle shaft secured to the apex of the sector shaped member, a series of flat continuous spring fingers having relatively fixed interlocking engagement with the supporting member and extending radially beyond the margin thereof opposite the handle in a common plane parallel with the plane of the supporting member, a series of spaced tongues located at the margin of the supporting member intermediate succeeding fingers, and a clamping member common to a plurality of the fingers overlying the fingers and secured by reversal of said tongues.

10. In an implement of the character described, a supporting member, a plurality of flat metallic continuous finger strips fixedly secured to the supporting member and extending therefrom in radial directions with their flat sides parallel the supporting member, a series of integral marginal tongues formed upon the supporting member intermediate the finger strips, a retaining member disposed in overlapping relation with the plurality of finger strips, said tongues being reversely bent into overlapping relation with the retaining member for maintaining the finger strips in relatively spaced engaged relation with the support.

11. In an implement of the character described, a perforated supporting member, a handle shaft connected therewith, and a series of separate flat spring fingers carried by the member and projecting beyond the margin thereof in radially disposed relation in a common plane parallel with that of the supporting member, and means for securing the spring fingers to the support in relatively spaced relation with each other including a series of marginal tongues carried by the support and reversely bent intermediate the succeeding spring fingers.

12. In an implement of the character described, a substantially sector shaped supporting member, a handle shaft secured to the apex of the sector shaped member, spaced tongues formed on the margin of the supporting member, a series of flat continuous spring fingers mounted upon the supporting member and extending therebeyond in radial positions disposed intermediate the marginal tongues, a retaining member overlying the engaged ends of the fingers and held in position by reversal of the marginal tongues.

13. In an implement of the character described, a substantially sector shaped supporting member, a handle shaft secured to the apex of the sector shaped member, spaced tongues formed on the margin of the supporting member, a series of flat continuous spring fingers mounted upon the supporting member and extending therebeyond in radial positions disposed intermediate the marginal tongues, and means for locking the fingers in adjusted position relative to the supporting member by reversal of the marginal tongues.

14. In an implement of the character described, a substantially sector shaped supporting member, a handle shaft secured to the apex of the sector shaped member, said supporting member being perforated at spaced intervals, flat fingers having laterally offset ends interlocked in the perforations of the supporting member and projecting in radially disposed relation therebeyond, and means including marginal tongues formed upon the supporting member to lock the fingers in interlocked relation with the supporting member by reversal of said tongues.

In testimony whereof, I have hereunto set my hand this 31st day of January, A. D. 1928.

JOHN W. LAMBERT.